Feb. 21, 1967 G. P. BLOCK 3,304,907

HOSPITAL CHART HOLDER WARNING SIGNAL UNIT

Filed Sept. 22, 1966

INVENTOR.
GEORGE P. BLOCK

BY Charles B. Cannon
ATTY.

United States Patent Office 3,304,907

Patented Feb. 21, 1967

3,304,907
HOSPITAL CHART HOLDER WARNING SIGNAL UNIT

George P. Block, Park Ridge, Ill., assignor to The Algonquin Corporation, Skokie, Ill., a corporation of Illinois Filed Sept. 22, 1966, Ser. No. 581,252
3 Claims. (Cl. 116—133)

This invention relates to a hospital chart holder warning signal unit.

An object of the invention is to provide a new and improved hospital chart holder warning signal unit which is simple and inexpensive in construction, easy to operate, and reliable in operation.

Additional object of the invention is to provide a new and improved hospital chart holder warning signal unit which in use minimizes the possibility of error.

Other objects will appear hereinafter.

Figure 1:
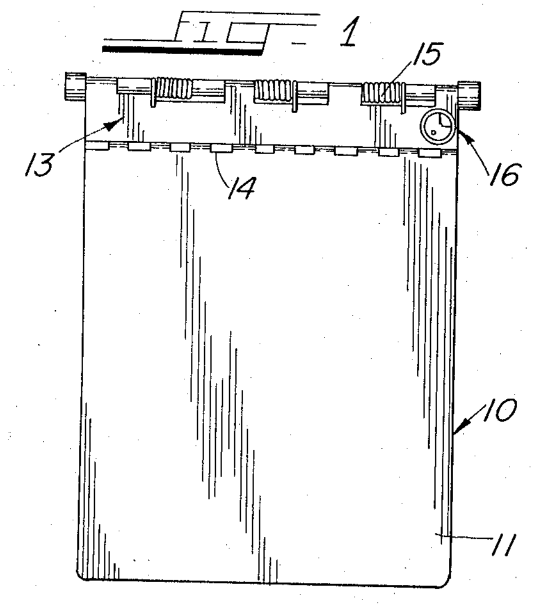
FIG. 1 is a top plan view of a hospital chart holder warning signal embodying a typical form of the new hospital chart holder warning signal.
Figure 2:
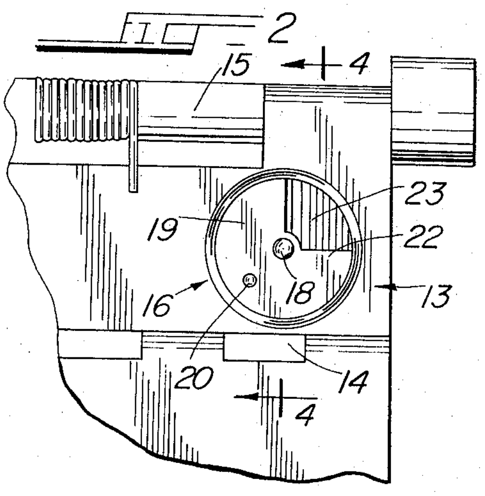
FIG. 2 is an enlarged fragmentary detail view of the upper right-hand portion of the hospital chart holder warning signal unit shown in FIG. 1.

A typical embodiment of the new hospital chart holder warning signal is shown in the drawings, wherein it is generally indicated at 16, and is shown as being associated with a hospital chart holder 10 which includes a main top cover member 11 and a bottom plate member 12. The hospital chart holder 10–11 includes an upper top cover portion 13 which is hingedly connected, as at 14, to the upper edge portion of the main top cover member 11, as is well understood in the art. The upper top cover portion 13 is likewise hingedly connected, by hinge means 15, to the bottom plate member 12, as is also well understood in the art.

The new hospital chart warning signal unit 16 is mounted in the upper right-hand portion of the top cover portion 13 of the top cover unit 11–13 of the hospital chart holder 10.

Figures 4, 5:
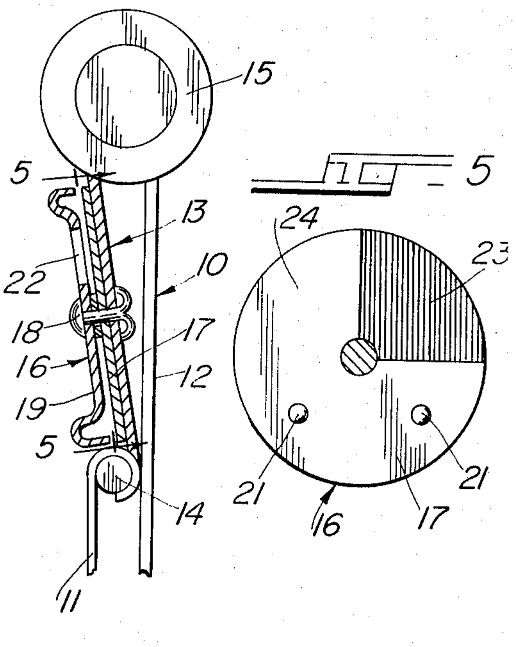
FIG. 4 is an enlarged vertical sectional view of the new hospital chart holder warning signal unit on line 4—4 in FIG. 2.
FIG. 5 is a sectional plan view on line 5—5 in FIG. 4.

The new hospital chart warning signal unit 16 includes an indicia-bearing and relatively stationary disc portion 17 which is attached to the top cover unit 11–13, by means of a headed rivet 18, as best shown in FIG. 4. A movable disc 19 is rotatably mounted on the headed rivet 18, above the disc 17, and a sight opening 22 is formed in the disc 19 and is shown as being in the form of an arc-shaped area or quadrant appoximately equal to one-fourth of the surface area of the disc 19.

The relatively stationary indicia-bearing disc 17 has an area 23 which corresponds approximately to the size of the sight opening 22 in the rotatable disc 19 and this area 23 is suitably colored such, for example, in red, whereas, the other three-fourths of the upper face of the relatively stationary disc 17, namely, the area 24, may be colored entirely white or it may be colored one-fourth in each of three different colors, such, for example, as white, blue and green. In addition, if desired one of such colors, such as green, may be coded to indicate a doctor's name.

Figure 6:
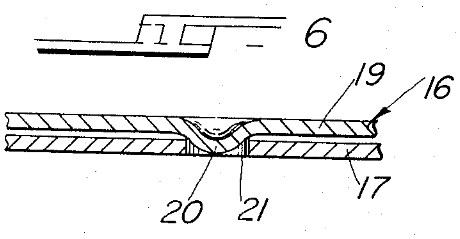
FIG. 6 is a enlarged sectional detail view on line 6—6 in FIG. 3.

A latching means is provided for firmly latching the rotatable disc 19 to the relatively stationary indicia-bearing disc 17. This latching means includes a pair of spaced latch openings 21 in the relatively stationary disc 17 and a latching detent 20 in the rotatable disc 19 which is adapted to selectively latchingly engage in either of the latch openings 21, as best shown in FIG. 6.

Figure 3:
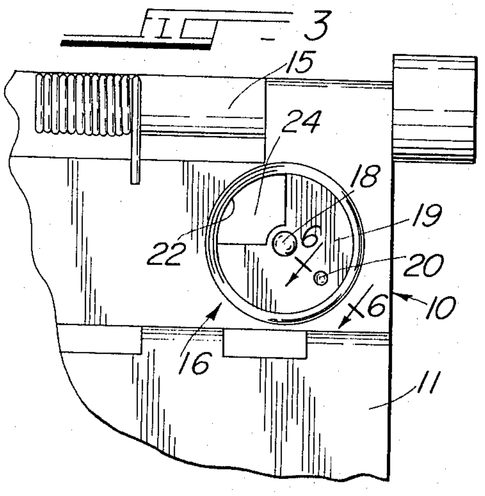
FIG. 3 is another fragmentary enlarged detail view of the parts shown in FIG. 2 but showing the warning signal unit in a different position.

In the use of the new hospital chart warning signal unit 16, the same may be mounted as shown in the drawing, and when so mounted the normal position of the rotatable disc 19, relative to the stationary indicia-bearing disc 17, when the hospital chart 10 is inactive, is for the parts to be in the position in which they are shown in FIG. 3 with the sight opening 22 in the rotatable disc 19 exposing a portion of the other colored area 24 on the upper face of the stationary disc 17. However, when the doctor places an order in the hospital chart holder 10 he manipulates the rotatable disc 19 until the sight opening 22 therein comes into registry with the red colored area 23 on the stationary disc 17 so that the red colored area 23 will be visible through the sight opening 22 in the rotatable disc 19. In this position of the parts, the latching detent 20 will engage in one of the latch openings 21 and thus firmly latch the rotatable disc 19 to the stationary disc 17 until such time as the nurse executes the orders of the doctor, as placed in the chart holder 10. However, as soon as and when the nurse carries out the doctor's orders in the hospital chart holder 10, she then manipulates the rotatable disc 19 so as to move the sight opening 22 out of registry with the red colored area 23 and so that the body portion of the rotatable disc 19 covers the red colored area 23, and with that portion of the other colored area 24 of the front face of the rotatable disc 17 being exposed through the sight opening 22 to indicate that the nurse has carried out the doctor's orders as placed in the hospital chart holder.

It will thus be seen from the foregoing description, considered in conjunction with the accompanying drawing, that the present invention provides a new and improved hospital chart holder warning signal unit having the desirable advantages and characteristics, and accomplishing its intended objects, including those hereinbefore pointed out and others which are inherent in the invention.

I claim:

1. A hospital chart holder warning signal unit comprising, in combination, with a hospital chart holder which includes a top cover member, (1) a relatively stationary indicia-bearing disc mounted on the upper surface of the said top cover member, (2) a movable disc rotatably mounted on the said relatively stationary disc above the latter, the said movable disc having (a) a sight opening therein through which a portion of the said relatively stationary indicia-bearing disc may be seen; and (3) latching means for releasably latching the said movable disc in preselected positions upon and to the said relatively stationary indicia-bearing discs.

2. A hospital chart holder warning signal unit as defined in claim 1 in which (a) the upper surface of the said relatively stationary indicia-bearing disc has a red colored area approximately equal to the area of the said sight opening in the said movable disc; and in which (b) the remaining area of the upper surface of the said relatively stationary indicia-bearing disc having another and preselected color other than red.

3. A hospital chart holder warning signal unit as defined in claim 1 in which (a) the upper surface of the said relatively stationary indicia-bearing disc has an area thereof approximately equal to the area of the said sight opening in the movable disc and approximately equal to a quadrant of its surface area colored red, and in which (b) the remaining surface area of the said relatively stationary disc having another and preselected color other than red.

No references cited.

LOUIS J. CAPOZI, *Primary Examiner.*